United States Patent [19]

Keys

[11] Patent Number: 5,095,656
[45] Date of Patent: Mar. 17, 1992

[54] INTEGRAL TRIM AND GLASS RUN CHANNEL

[75] Inventor: James F. Keys, West Bloomfield, Mich.

[73] Assignee: The Standard Products Company, Cleveland, Ohio

[21] Appl. No.: 390,601

[22] Filed: Aug. 7, 1989

[51] Int. Cl.⁵ .................................................. E05D 15/16
[52] U.S. Cl. .................................... 49/441; 49/491
[58] Field of Search ................... 49/440, 441, 491, 501

[56] References Cited

U.S. PATENT DOCUMENTS

| | | | |
|---|---|---|---|
| 1,876,519 | 9/1932 | McKinney | 49/441 |
| 3,401,075 | 9/1968 | Jackson | 49/441 |
| 3,448,550 | 6/1969 | Herr et al. | 49/440 |
| 4,271,634 | 6/1981 | Andrzejewski | 49/441 X |
| 4,308,305 | 12/1981 | Albrecht | 49/441 X |
| 4,572,872 | 2/1986 | Yamazaki et al. | 49/441 |
| 4,656,784 | 4/1987 | Brachmann | 49/441 |
| 4,783,931 | 11/1988 | Kirkwood | 49/441 |
| 4,800,681 | 1/1989 | Skillen et al. | 49/440 |

FOREIGN PATENT DOCUMENTS

| | | |
|---|---|---|
| 0241264 | 10/1987 | European Pat. Off. . |
| 0307304 | 3/1989 | European Pat. Off. . |
| 2575428 | 7/1986 | France . |
| 489497 | 1/1954 | Italy ................ 49/440 |
| 640966 | 8/1950 | United Kingdom . |

Primary Examiner—Renee S. Luebke
Assistant Examiner—Michael J. Milano
Attorney, Agent, or Firm—Harness, Dickey & Pierce

[57] ABSTRACT

The present invention relates to a glass run channel molding having a structural core encased in an elastomeric material. The glass run channel molding has, in cross-section, a first U-shaped channel for clamping retention on a pinchweld flange or the like and a second U-shaped channel to receive a guide a window pane. The structural core is a sheet having a band along one lateral edge and a plurality of laterally extending narrow strips with free ends, extending laterally therefrom. A surface of the band has surface exposed to view for decorative purposes. The structure of the core facilitates bending of the integral trim and glass run channel about the window frame.

18 Claims, 2 Drawing Sheets

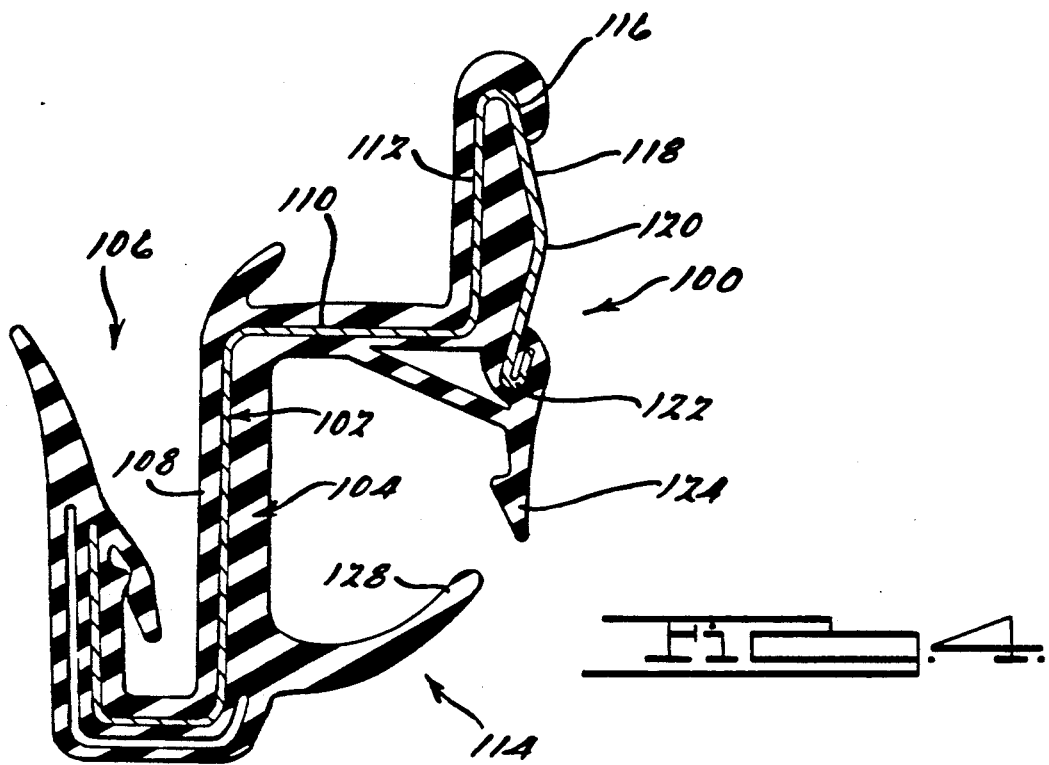
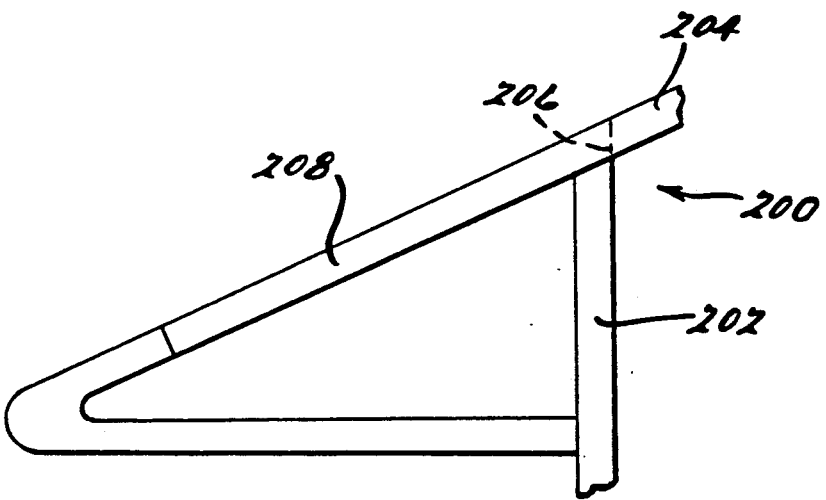

INTEGRAL TRIM AND GLASS RUN CHANNEL

The present invention relates to glass run channel molding for windows of automotive vehicles and more particularly to an integral trim and glass run channel molding for enhancing the appearance of an automotive vehicle and for sealing a movable window pane in the window of a door of an automotive vehicle.

Glass run channel is conventionally employed in windows of automotive vehicles to provide a guide and seal for the window pane when it is raised and lowered. Glass run channel also protects the pane from damage due to vibration. In some glass run channels a portion of the glass run channel is exposed to view from either, or both, the interior or exterior of the vehicle and, hence, such glass run channel also serves a trim or decorative function. This is particularly the case with modern flush or semi-flush glass run channel which holds the glass pane coplanar or almost coplanar with adjacent vehicle body surfaces and which is secured to a pinchweld flange extending around the window of the door.

While glass run channel moldings are known, there remains a need for improved glass run channel and in particular glass run channel which serves to enhance the appearance of the vehicle by presenting an improved decorative trim surface. There also remains a need to reduce the cost of manufacture of glass run channel molding and associated trim. In addition, there remains a need for structurally strong glass run channel yet which can be bent or curved about a window opening. Accordingly, the present invention provides an integral trim and glass run channel which can be curved, which serves both decorative trim and glass run channel functions and can be economically manufactured.

SUMMARY OF THE INVENTION

The present invention relates to a glass run channel molding having a structural core encased in an elastomeric material. The glass run channel molding has, in cross-section, a first U-shaped channel for clamping retention on a pinchweld flange or the like and a second U-shaped channel to receive and guide a window pane. The structural core is a sheet having a band along one lateral edge and a plurality of laterally extending narrow strips with free ends, extending laterally therefrom. A surface of the band has surface exposed to view for decorative purposes. The structure of the core facilitates bending of the integral trim and glass run channel about the window frame.

BRIEF DESCRIPTION OF THE DRAWINGS

FIG. 4 is a cross-sectional view, analogous to FIG. 2 but showing an alternative preferred embodiment of an integral trim and glass run molding of the present invention.

FIG. 5 is a side elevation, broken away, of a sail of an automotive vehicle and showing a variation of an integral trim and glass run channel molding of the present invention.

DETAILED DESCRIPTION OF THE PREFERRED EMBODIMENTS

Figure 1:
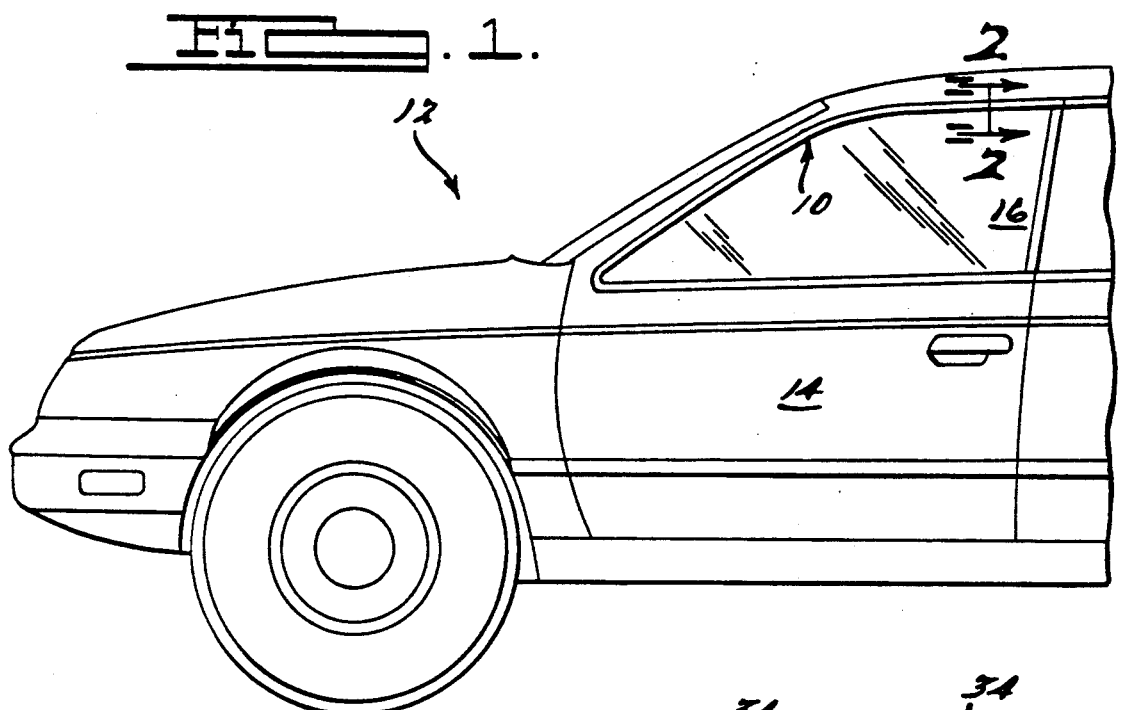
FIG. 1 is a side elevation, broken away, of an automotive vehicle on which a preferred embodiment of an integral trim and glass run channel molding of the present invention is assembled.
Figure 2:
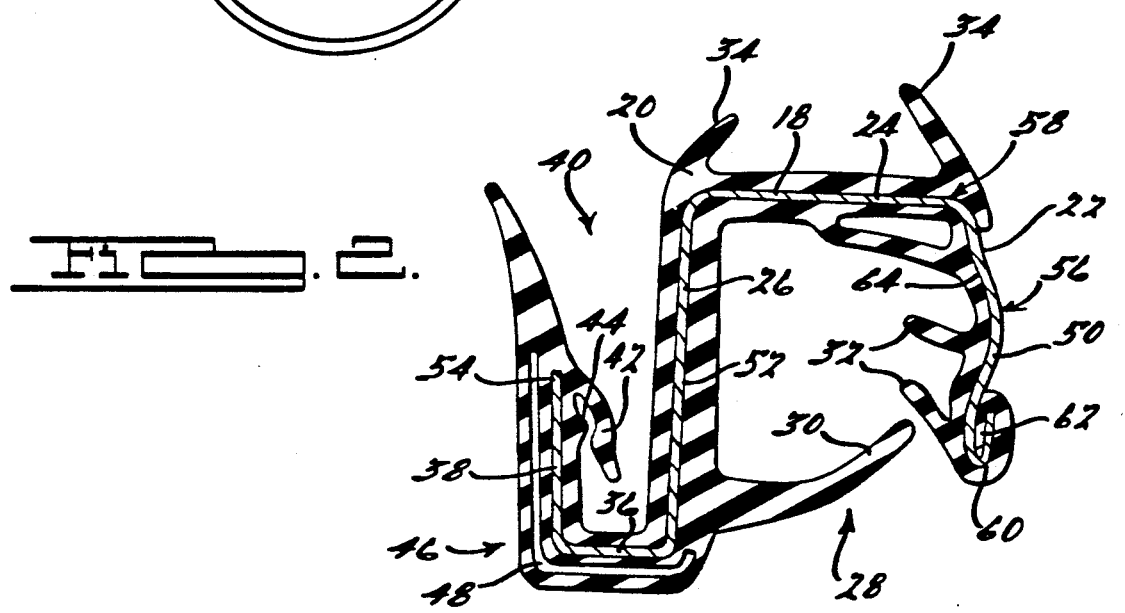
FIG. 2 is a cross-sectional view taken along line 2—2 of FIG. 1 with the door flange and window pane not shown.

Now referring to the Figures, a preferred embodiment of an integral trim and glass run channel molding of the present invention is shown and indicated generally in FIGS. 1 and 2 by the numeral 10. As illustrated in FIG. 1, integral trim and glass run channel molding 10 extends around the top and side of window molding 12 in door 14 of an automotive vehicle having a movable window pane 16.

Molding 10 generally comprises a support core 18 which is largely embedded within an elastomeric cover 20 which can comprise, for example, EPDM (70 Shore A) rubber or like elastomeric material Support core 18 is preferably made of stainless steel or other decorative metallic material, such as coated aluminum or steel, and is formed into a generally S-shaped cross-section to provide an outer leg 22, web 24, common leg 26 to thereby define a glass run channel 28. Glass run channel 28 has conventional glass run ribs 30 and 32, the glass pane contacting surfaces of which preferably have a low friction coating such as flocking thereon to facilitate sliding movement of the glass pane in the channel. The portion of elastomeric cover 20 over web 18 has conventional sealing lips 34 thereon.

In combination with common leg 26 of core 18, web 36 and leg 38 of core 18 define flange retention channel 40. Provided from elastomeric cover 20 within flange retention channel 40 is an arrow-shaped rib 42 with cooperating locking projection 44 which provides means for retaining flange retention channel 40 and, hence, molding 10 on the conventional flange about the window frame of door 14 of automotive vehicle 12.

The surface area of elastomeric cover 20 indicated generally by numeral 46 can, in some installations, be exposed to the view of persons inside automotive vehicle 12. To ensure a smooth outer surface of elastomeric cover 20 in this area, a hollow cavity 48 is provided during extrusion of elastomeric cover 20. Hollow cavity 48 ensures that the typical "hungry horse" appearance caused by the effect of the core strip spacing on elastomeric covers will not carry through to the outer surface of elastomeric cover 20.

Figure 3:
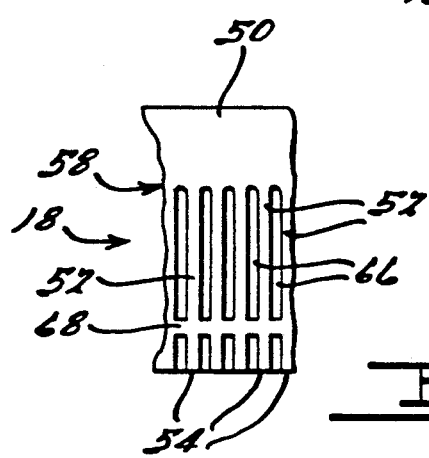
FIG. 3 is a plan view of the metal core, before shaping, of the preferred embodiment of FIG. 1.

A better understanding of the core structure of the present invention and the advantages provided thereby can be had by referring to FIGS. 2 and 3. Support core 18 has a longitudinally extending band 50 with a plurality of separated narrow strips 52 extending laterally therefrom at 58, each strip 52 having a free end 54.

Leg 22 of support core 18 includes band 50, a portion of which presents show surface 56 to view for decorative trim purposes. Lateral edge 60 of leg 22 has a dutch bend therein forming an open channel 62 retaining elastomeric core 20 therein.

Molding 10 of the present invention can be made in accordance with the following process sequence. First, the core 18 is punched from stainless steel core metal in a flat strip as shown in FIG. 3. Then side 64 of the flat strip of core metal is coated with Chemlok or other primer to ensure bonding of an elastomeric cover thereon on the desired surface portion of core 18. The flat strip of core metal is then roll formed into the desired core shape and elastomeric cover 20 is extruded thereon. Elastomeric cover 20 also is well retained on core 18 through apertures 66 between strips 52. Flocking or other low friction coating for the glass run channel can be next applied as is conventional in the art. Then the links 68 between core strips 52 are broken, for example, by using hydraulic pressure obtained by passing the molding 10 between rollers. Optionally, the core metal can be formed with one or more channels slightly more open than desired in the final cross-section and then closed up in a final forming step before the molding is cut to the exact length. Then molding 10 is sweep-bent into the desired shape for installation about the door frame of the vehicle. If necessary for example to form a 90° corner, the glass run channel molding 10 can be miter cut and joined in any conventional manner. It is an advantage of the present invention that because of the band and laterally extending strips with free ends of core 18, molding 10 has a neutral bending axis which facilitates bending of molding 10 about the window frame.

Now referring to FIG. 4, an alternative preferred embodiment of the present invention is shown and indicated by the numeral 100. Integral trim and glass run channel molding 100 generally comprises a core 102 and elastomeric cover 104, however core 102 is formed in a shape different than core 18 of molding 10. Molding 100 has a flange retention channel 106 which is constructed in a manner analogous to the corresponding flange retention channel of molding 10. However, core 102 of molding 100 also has a common leg 108, web 110 and leg 112 which extends in a direction away from the opening of glass run channel 114. Leg 112 is reversely bent at 116 to provide a leg 118 which presents a show surface 120 to view. Lateral edge 122 has a dutch bend therein which provides a mechanical means for retention of elastomeric cover 104 therein. Glass run channel 114 is provided by common leg 108, web 110 and the elastomeric cover 104 thereon along with glass run leg 124 which is provided by a portion of elastomeric cover 104. A support web 126, extending between the medial length of glass run leg 124 and the medial length of web 10. Support web 126 operates to draw in glass run channel leg 124 when contacted by the edge of glass pane 16. Glass run channel 114 can also have lip 128 and a low friction coating on glass contacting surfaces therein as is conventional in the art.

It will be appreciated by those skilled in the art that integral trim and glass molding 100 can be made by the process steps set forth with respect to molding 10, except that the forming steps are adapted to form the shape shown in cross-section of FIG. 4 instead of that of FIG. 2.

As illustrated in FIG. 5, with respect to a sail plate portion of a conventional automotive vehicle door, a integral trim and glass run channel molding of the present invention is shown and indicated generally by the numeral 200. Molding 200 is constructed as in the embodiment of FIGS. 1 and 2 and can have a vertically extending glass run channel 202 and a generally horizontally extending header 204. The glass run channel and flange retention channel portions of header 204 can be cut and terminated at 206 so that only the show surface leg extends along the section 208 to serve a trim function only.

While the above description illustrates and describes preferred embodiments in the present invention, it will become apparent to those skilled in the art that modification, variations and alterations may be made without deviating from the scope of the present invention which is defined in fair meaning of the subjoined claims.

What is claimed is:

1. An integral trim and glass run molding having a flange retention channel and a glass run channel, said molding comprising a structural core covered with an elastomeric cover, said structural core having a single solid longitudinally extending band along one lateral edge thereof with a plurality of narrow strips extending laterally therefrom, each of said strips having one end unitary with said band and another free end, said single band having a surface portion thereof exposed to view.

2. A molding as in claim 1, wherein said core is comprised of stainless steel.

3. A molding as in claim 1, wherein a lateral edge portion of said band is reversely bent providing an edge channel and a portion of said elastomeric cover is in said edge channel.

4. A molding as in claim 1, wherein said elastomeric cover has a longitudinally extending hollow tube along said narrow strips, said tube being positioned between said strips and an outwardly facing surface of said elastomeric cover.

5. A molding as in claim 2, wherein said core has a surface portion coated with primer and a surface portion free of said primer.

6. A molding as in claim 5, wherein a lateral edge portion of said band is reversely bent providing an edge channel and a portion of said elastomeric cover is in said edge channel.

7. A molding as in claim 6, wherein said elastomeric cover has a longitudinally extending hollow tube along said narrow strips, said tube being positioned between said strips and an outwardly facing surface of said elastomeric cover.

8. A molding as in claim 1, wherein said core has, in cross-section, a U-shaped portion and an L-shaped portion, one leg of said L-shaped portion forming a web of a glass run channel and the other leg of said L-shaped portion extending away from said glass run channel, said glass run channel having an outer leg comprised of said elastomeric cover with a support web extending between intermediate parts of said elastomeric cover over said glass run channel web and said outer leg.

9. A molding as in claim 8, wherein said core is comprised of stainless steel.

10. A molding as in claim 8, wherein said other leg of said L-shaped portion having a show surface exposed to view.

11. A molding as in claim 8, wherein said other leg has a lateral edge reversely bent to form an open channel and a portion of said elastomeric cover is in said channel.

12. A molding as in claim 8, wherein said elastomeric cover has a longitudinally extending hollow tube along said narrow strips, said tube being positioned between said strips and an outwardly facing surface of said elastomeric cover.

13. A molding as in claim 8, wherein said core has a surface portion coated with primer and a surface portion free of said primer.

14. A molding as in claim 9, wherein said other leg of said L-shaped portion having a show surface exposed to view.

15. A molding as in claim 14, wherein said other leg has a lateral edge reversely bent to form an open channel and a portion of said elastomeric cover is in said channel.

16. A molding as in claim 15, wherein said elastomeric cover has a longitudinally extending hollow tube along said narrow strips, said tube being positioned between said strips and an outwardly facing surface of said elastomeric cover.

17. A molding as in claim 16, wherein said core has a surface portion coated with primer and a surface portion free of said primer.

18. A molding as in claim 1, wherein said band extends longitudinally beyond said strips and elastomeric cover thereon.

* * * * *